US012014719B2

(12) United States Patent
Chen et al.

(10) Patent No.: US 12,014,719 B2
(45) Date of Patent: Jun. 18, 2024

(54) ACTIVE NOISE CANCELLATION HEADPHONE

(71) Applicant: Beken Corporation, Shanghai (CN)

(72) Inventors: Lulai Chen, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 173 days.

(21) Appl. No.: 17/932,336

(22) Filed: Sep. 15, 2022

(65) Prior Publication Data

US 2024/0071357 A1 Feb. 29, 2024

(30) Foreign Application Priority Data

Aug. 30, 2022 (CN) ......................... 202211049701.5

(51) Int. Cl.
*A61F 11/06* (2006.01)
*G10K 11/178* (2006.01)
*H04R 1/10* (2006.01)

(52) U.S. Cl.
CPC .................. *G10K 11/17854* (2018.01); *G10K 2210/1081* (2013.01)

(58) Field of Classification Search
CPC ................. G10K 11/17854; G10K 2210/1081
USPC ................................................. 381/74, 71.11
See application file for complete search history.

(56) References Cited

U.S. PATENT DOCUMENTS

2014/0321682 A1* 10/2014 Kofod-Hansen ...... H04R 25/30 381/315
2023/0134787 A1* 5/2023 Chen ................ G10K 11/17837 381/71.6

* cited by examiner

*Primary Examiner* — Ammar T Hamid
(74) *Attorney, Agent, or Firm* — Schwegman Lundberg & Woessner, P.A.

(57) ABSTRACT

An Active Noise Cancellation (ANC) headphone of multiple modes may include a preliminary scene-change detection circuit using ultra-low power to detect a scene change near the headphone and to send a trigger signal upon detecting the scene change, a scene identification circuit to determine a current scene upon receiving a trigger signal, and a filter switch circuit to switch the headphone mode from a previous headphone mode to a current headphone mode according to the determined current scene. In this way, the ANC headphone can automatically obtain an improved balance of comfortability, safety, and communicability under a reduced power consumption.

20 Claims, 3 Drawing Sheets

ACTIVE NOISE CANCELLATION HEADPHONE

CROSS REFERENCE TO RELATED APPLICATIONS

This application claims priority to and incorporates by reference Chinese patent application no. 202211049701.5 filed Aug. 30, 2022.

TECHNICAL FIELD

The present application relates to a headphone, and more particularly an Active Noise Cancellation (ANC) headphone.

BACKGROUND

Nowadays, noise pollution has been an issue harmful to human health. To address the noise pollution, ANC headphones are typically used to reduce noise level to provide comfortability. However, ANC headphones may cause safety and communication concerns in some situations due to significant reduction of environmental noise, such as traffic noise on the street and talk voices of colleagues at the workplace.

BRIEF DESCRIPTION

According to an embodiment, an ANC headphone of multiple modes includes a preliminary scene-change detection circuit, a scene identification circuit, a filter switch circuit, and a speaker connected to the filter switch circuit. The preliminary scene-change detection circuit (1) uses ultra-low power to detect a scene change near the headphone, and includes: an ultra-low power ADC, a Fast Fourier Transform (FFT) circuit, and a dedicated low-power Micro-Controller Unit (MCU) connected in series. The preliminary scene-change detection circuit is connected to an ultra-low power microphone to capture external noise, and upon detecting a scene change, the preliminary scene-change detection circuit emits a trigger signal. The scene identification circuit is connected to a Forward Feedback (FF) microphone to capture the external noise, to start identifying a current scene near the headphone upon receiving the trigger signal, and to create a commend set. The scene identification circuit includes: an active controller connected to the preliminary scene-change detection circuit, a down sample circuit to sample signals received from the FF microphone with a low sample rate, a symbol extraction circuit, a mode-match circuit, a mode switch, and a local filter-coefficient storage. The commend set includes a set of local filter-coefficients. The filter switch circuit switches a headphone mode to a current headphone mode corresponding to the current scene based on the commend set received from the scene identification circuit, and includes: a set of Infinite Impulse Response (IIR) filters and a set of output filter respectively connected. The filter switch circuit updates a set of IIR filter-coefficients of the set of IIR filters.

According to an embodiment, a computer-implemented method of identifying a scene change near a headphone includes: sequentially obtaining frequency spectrums of voice signals of external noises near the headphone in a predetermined time interval (ΔT); comparing a current frequency spectrum (CSp) with a previous frequency spectrum (PSp) to calculate a first correlation (cor1) between the current and previous frequency spectrums; responsive to detecting the first correlation (cor1) greater than a first threshold (thres1), adding the current frequency spectrum to a first long-time spectrum smooth (smooth1), and then smoothing the first long-time spectrum smooth; responsive to detecting the first correlation (cor1) not grater than the first threshold (thres1), adding the current frequency spectrum to a second long-time spectrum smooth (smooth2), then smoothing the second long-time spectrum smooth, and increasing a total number of frequency spectrums in the second long-time spectrum smooth by 1; calculating a second correlation (cor2) between the first long-time spectrum smooth (smooth1) and the second long-time spectrum smooth (smooth2); and responsive to detecting the second correlation (cor2) not greater than a second threshold (thres2) and detecting the total number of the frequency spectrums in the second long-time spectrum smooth (smooth 2) equal to a count-threshold (cnt-thres), determining an occurrence of scene change near the headphone to send off a trigger signal.

According to an embodiment, a computer-implemented method of switching headphone modes of a headphone, the headphone including: a preliminary scene-change detection circuit operating under ultra-low power; a scene identification circuit; and a filter switch circuit comprising a set of filters, the method including: preliminarily detecting a scene change near the headphone by the preliminary scene-change detection circuit; responsive to detecting the scene change, identifying a current scene by the scene identification circuit to output a commend set comprising a first set of filter coefficients; and responsive to receiving the commend set, switching by the filter switch circuit a headphone mode of the headphone to a current headphone mode, by updating a second set of filter coefficients of the set of filters of the filter switch circuit based on the commend set from the scene identification circuit.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, for concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking an ANC headphone with multiple headphone modes that is capable to keep on preliminarily detecting scene changes near the ANC headphone using ultra-low power, to trigger to detect a current scene near the ANC headphone upon detecting a scene change, and to switch the headphone mode to a current headphone mode from a previous headphone mode based on the detected current scene. In this way, the ANC headphone can operate under reduced power consumption and can obtain an improved balance of comfortability, safety and communicability. Those of ordinary skills in the art understand that this is only to describe the application clearly and adequately, rather than limit the scope of the application.

The "headphone modes" or simply "modes" may include an ANC mode, a Passive Noise Cancellation (PNC) mode, and a Transparency (TP) mode, for example, which are explained below.

The "ANC mode" indicates that the headphone is working with ANC function on in this description. In the ANC mode, in comparing with other headphone modes, less external noise may reach a headphone wearer due to the ANC function.

The "PNC mode" indicates that the ANC function of the headphone is turned off, and thus the headphone actually works like earbuds in this description. In the PNC mode, in comparing with the ANC mode, more external noise may reach a headphone wearer.

The "TR mode" indicates that the headphone is working with ANC function off and also allowing almost all external noise to reach the wearer (thus almost transparent to the wearer) in this description. In the TR mode, in comparing with the ANC and PNC modes, more external noise may reach a headphone wearer.

The "scenes" indicate acoustic environments (e.g., heavy traffic streets, crowed train stations, quiet offices, or noisy construction sites, etc.) that may have recognizable acoustic characters or features. The terms of "scenes" and "environments" can be interchangeable in this description.

Figure 1:
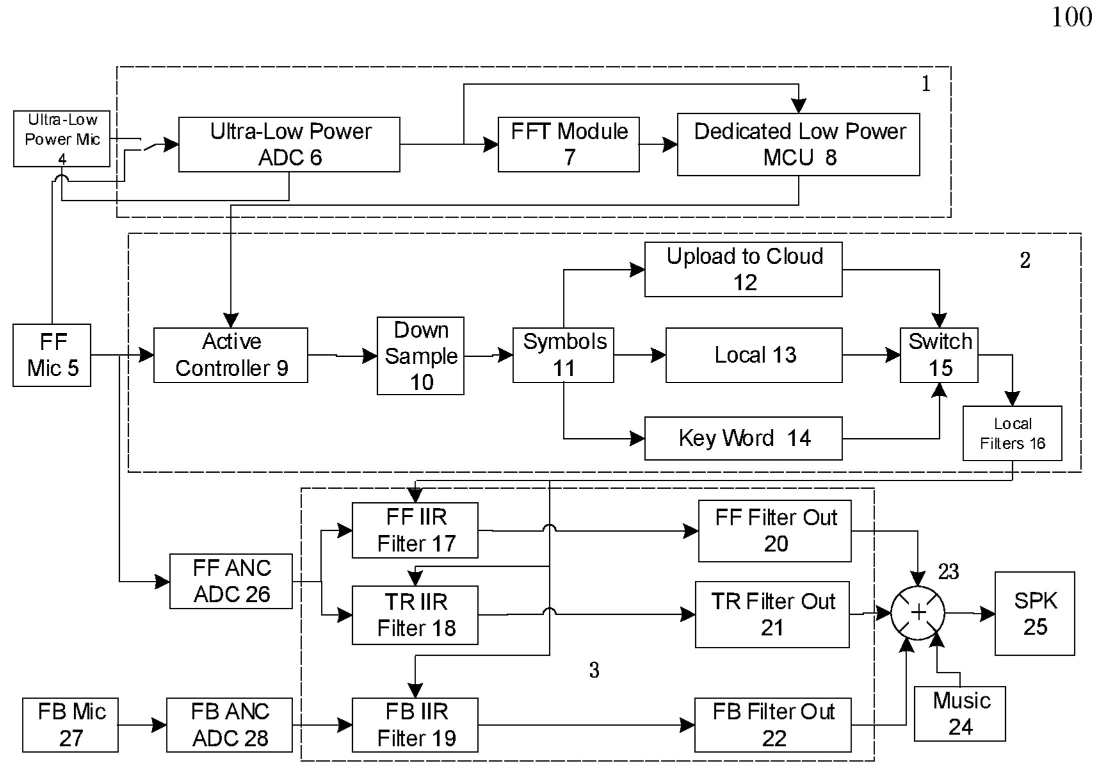
FIG. 1 is a diagram illustrating an ANC headphone 100 according to an embodiment.

FIG. 1 is a diagram illustrating an ANC headphone 100 according to an embodiment. The ANC headphone 100 may include a preliminary scene-change detection circuit 1 using ultra-low power to preliminarily detect an occurrence of a scene change (e.g., from a quiet office scene to a heavy traffic street scene), a scene identification circuit 2 to start to identify a current scene (e.g., the heavy-traffic-street scene) upon being triggered by the preliminary scene-change detection circuit 1, and a filter switch circuit 3 to switch the headphone modes of the headphone 100 from a previous headphone mode (e.g., ANC mode that may sound more comfortable) to the current headphone mode (e.g., TR mode that may help the wearer be more alert to the sounding environment, e.g., the heavy-traffic-street).

The preliminary scene-change detection circuit 1, operating under an ultra-low power consumption, may constantly or continuously detect whether a scene change near or around the headphone 100 worn by a wearer is occurring. Once a scene change is detected, the preliminary scene-change detection circuit 1 will send a trigger signal to wake up the scene identification circuit 2 to start to identify a current scene (e.g., the heavy-traffic-street scene) near the ANC headphone 100. The preliminary scene-change detection circuit 1 of the ANC headphone 100 can use an algorithm 200, which will be explained with respect to FIG. 2, to primarily determine whether a scene change is occurring.

In responsive to receiving the trigger signal from the preliminary scene-change detection circuit 1, the scene identification circuit 2 is waken up to determine a current scene near the ANC headphone 100 according to the acoustic characters or features of the received background or environmental sounds.

The scene identification circuit 2 can identify a plurality M of different scenes. For example, M=5, the scenes may include a heavy traffic street scene, a crowed train station scene, a quiet office scene, a noisy construction site scene, and an airport scene. The current scene can be labeled with a scene label selected from multiple scene labels such as 1, 2, 3, . . . and M etc. For example, scene label 1 may represent a scene 1 of a heavy-traffic street, scene label 2 may represent a scene 2 of a crowed train station, scene label 3 may represent a scene 3 of a quiet office, scene label 4 may represent a scene 4 of a noisy construction site, and scene label 5 may represent a scene 5 of an airport.

One or more scenes may correspond to a single headphone mode, which can be one of a plurality N of headphone modes. N<=M, for example, N=3. For example, a heavy traffic street scene and a crowed train station scene may correspond to the TR mode. For example, once the headphone 100 detects that the current scene is the heavy traffic street scene or the crowed train station scene, the headphone 100 will switch the mode to the TR mode. The relationship between the scenes and the modes can be defined in a scene-mode map as shown below in Table 1.

TABLE 1

| | ANC mode | PNC mode | TR mode |
|---|---|---|---|
| Heavy traffic street scene | | | X |
| Train station scene | | X | |
| Noisy construction site scene | | X | |
| Quiet office scene | X | | |
| . . . | | | |

Each headphone mode may have a corresponding set of filter ecoefficiencies. Based on the identified or determined current scene (e.g., a heavy-busy-street scene), the scene identification circuit 2 may send a commend set to the filter switch circuit 3 in order to switch the headphone mode from a previous headphone mode (e.g., the ANC mode) corresponding to a previous scene (e.g., a quite-office scene) to a current headphone mode (e.g., the TR mode) corresponding to the current scene (e.g., a heavy-busy-street scene), thus may allow the wearer of the headphone 100 to be more alert about the soundings to be safer. The commend set may include a set of filter ecoefficiencies that define the headphone mode (e.g., the ANC mode).

In responsive to receiving the commend set from the scene identification circuit 2, the filter switch circuit 3 may switch the headphone mode of the headphone 100 from a previous headphone mode to a current headphone mode by adjusting or updating filter coefficients of a set of filters (e.g., filters 17-19 of the filter switch circuit 3) based on the received commend set.

In an embodiment, the preliminary scene-change detection circuit 1 may be connected to an ultra-low power microphone 4 to capture external or environmental noise. The preliminary scene-change detection circuit 1 may also be connected to a Forward Feedback (FF) microphone 5 to capture external or environmental noise in an embodiment. The preliminary scene-change detection circuit 1 may include an ultra-low power ADC 6, a Fast Fourier Transform (FFT) circuit 7, and a dedicated low-power Micro-Controller Unit (MCU) 8, connected in series. The preliminary scene-change detection circuit 1 may also include a timed start mechanism.

The scene identification circuit 2 may include an active controller 9, a down sample circuit 10 to sample signals with a low sample rate (e.g., 16 kHz) to obtain sampled signals, a symbol extraction circuit 11 to extract acoustic features from the sampled signals, multiple mode-match circuits (e.g., a cloud mode-match circuit 12, a local mode-match circuit 13, and a keyword-match circuit 14) connected in parallel, a mode switch 15, and a local filter-coefficients storage 16 saving local filter-coefficients. One of the mode-match circuits 12-14 can be selected to determine the current scene (e.g., a heavy-busy-street scene) according to the extracted acoustic features. The scene identification circuit 2 may by turned on or woken up upon receiving a trigger signal from the preliminary scene-change detection circuit 1.

One of the mode-match circuits 12-14 can be selected to determine the current scene (e.g., a heavy-busy-street scene) according to the extracted acoustic features by the symbol extraction circuit 11. The mode switch 15 may switch the mode from the previous mode (e.g., ANC mode) to the current mode (e.g., TR mode), and store corresponding local filter-coefficients in the local filter-coefficients storage 16.

The filter switch circuit 3 may include a set of Infinite Impulse Response (IIR) filters (such as an FF IIR filter 17, a TR IIR filter 18, and a FB IIR filter 19) respectively connected to a set of output filters (such as an output FF filter 20, an output TR filter 21, and an output FB filter 22). An IIR filter is a recursive filter in that the output from the IIR filter is computed by using the current and previous inputs and previous outputs. Because the IIR filter uses previous values of the output, there is feedback of the output in the IIR filter structure. The FF IIR filter 17 and the TR IIR filter 18 are connected in parallel to an FF ANC ADC 26, and the FF ANC ADC 26 is connected to the FF microphone 5 and the active controller 9. The FB IIR filter 19 is connected to a FB ANC ADC 28, which is connected to a FB microphone 27 that is placed near a Speaker (SPK) 25 to capture residual noise. The FF IIR filter 17, the TR IIR filter 18, and the FB IIR filter 19 are connected to the local filter-coefficients storage 16 to respectively receive local filter-coefficients stored in the local filter-coefficients storage 16. The FF ANC ADC 26, the FB microphone 27, and the FB ANC ADC 28 may be included in the filter switch circuit 3 according to an embodiment.

According to an embodiment, an adder 23 is connected to, and receives outputs from, the FF filter 20, the TR filter 21, and the FB filter 22. The adder 23 is also connected to a music source 24 to receive a piece of music for example. The SPK 25 is connected to the adder 23 to receive the output results from the adder 23.

Figure 2:
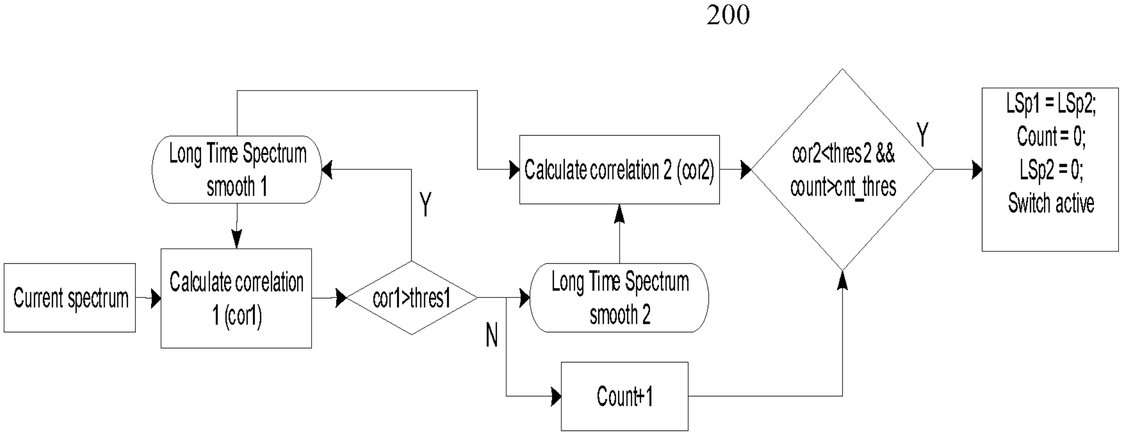
FIG. 2 is a diagram illustrating an algorithm 200 for preliminarily determine a scene change according to an embodiment.

FIG. 2 is a diagram illustrating an algorithm 200 applied by the ANC headphone 100 for preliminarily recognizing scene changes according to an embodiment.

The algorithm 200 may be applied by the preliminary scene-change detection circuit 1 operating using ultra-low power to primarily detect a possible scene change (e.g., changing from a quite-office-scene to a heavily-busy-street scene). Once detecting the scene change, the preliminary scene-change detection circuit 1 will send a trigger signal to waken up the scene identification circuit 2, the scene identification circuit 2 will determine a current scene near the ANC headphone 100, and the filter switch circuit 3 will switch the mode from the previous mode to the current mode.

Below explains how the algorithm 200 in the preliminary scene-change detection circuit 1 works by an example. The algorithm 200 may be stored in the preliminary scene-change detection circuit 1 in an embodiment.

In an embodiment, external (or environmental) noise can be captured by the FF microphone 5, and external noise electrical signals corresponding to the external noise can be obtained. Frequency spectrums of the external noise electrical signals are obtained every ΔT (e.g., 100 ms). For example, a previous frequency spectrum (PSp) is obtained at a previous time point T1, and a current frequency spectrum (CSp) is obtained at a current time point T2. T2=T1+ΔT. The current frequency spectrum (CSp) is compared with the previous frequency spectrum (PSp) to calculate a first correlation 1 (cor1) between the current frequency spectrum and the previous frequency spectrum. In an embodiment, ΔT can be in a range of 100-150 ms.

If the first correlation 1 (cor1) is determined to be greater than a first threshold (thres1), the current frequency spectrum (CSp) is added into a first long-time spectrum smooth 1 (smooth1), and after that the first long-time spectrum smooth 1 is smoothed.

Otherwise, if the first correlation 1 (cor1) is determined to be not greater than the first threshold (thres1), the current frequency spectrum (CSp) is added into a second long-time spectrum smooth 2 (smooth 2), after that the second long-time spectrum smooth 2 is smoothed, and the total number of the frequency spectrums in the second long-time spectrum smooth 2 (smooth 2) is increased by 1.

Then a long-time spectrum correlation of the first long-time spectrum smooth 1 (smooth1) and the second long-time spectrum smooth 2 (smooth2) is calculated to obtain a second correlation 2 (cor2).

If the second correlation 2 (cor2) is determined not greater than a second threshold (thres2) and the total number of the frequency spectrums in the second long-time spectrum smooth 2 (smooth 2) is detected to have reached a count-threshold (cnt-thres), then the algorithm 200 determines that a scene change (e.g., changing from a quite-office scene to a different scene) has occurred. Then, the preliminary scene-change detection circuit 1 will send a trigger signal to wake up the scene identification circuit 2 to start to detect a current scene (e.g., a heavily-busy-street scene or other scenes).

After that, the algorithm 200 starts a new round of preliminary detection of scene change. Initially, the first long-time spectrum smooth 1 (smooth1) is updated with the second long-time spectrum smooth 2 (smooth2), the second long-time spectrum smooth 2 is cleared, and the total number of the frequency spectrums in the second long-time spectrum smooth 2 (smooth2) is cleared and set to be 0. The previously stated processes will be repeated.

In this way, the preliminary scene-change detection circuit 1 of the ANC headphone 100 may continuously or constantly detect a scene change near the headphone 100 with an ultra-low power consumption.

Figure 3:
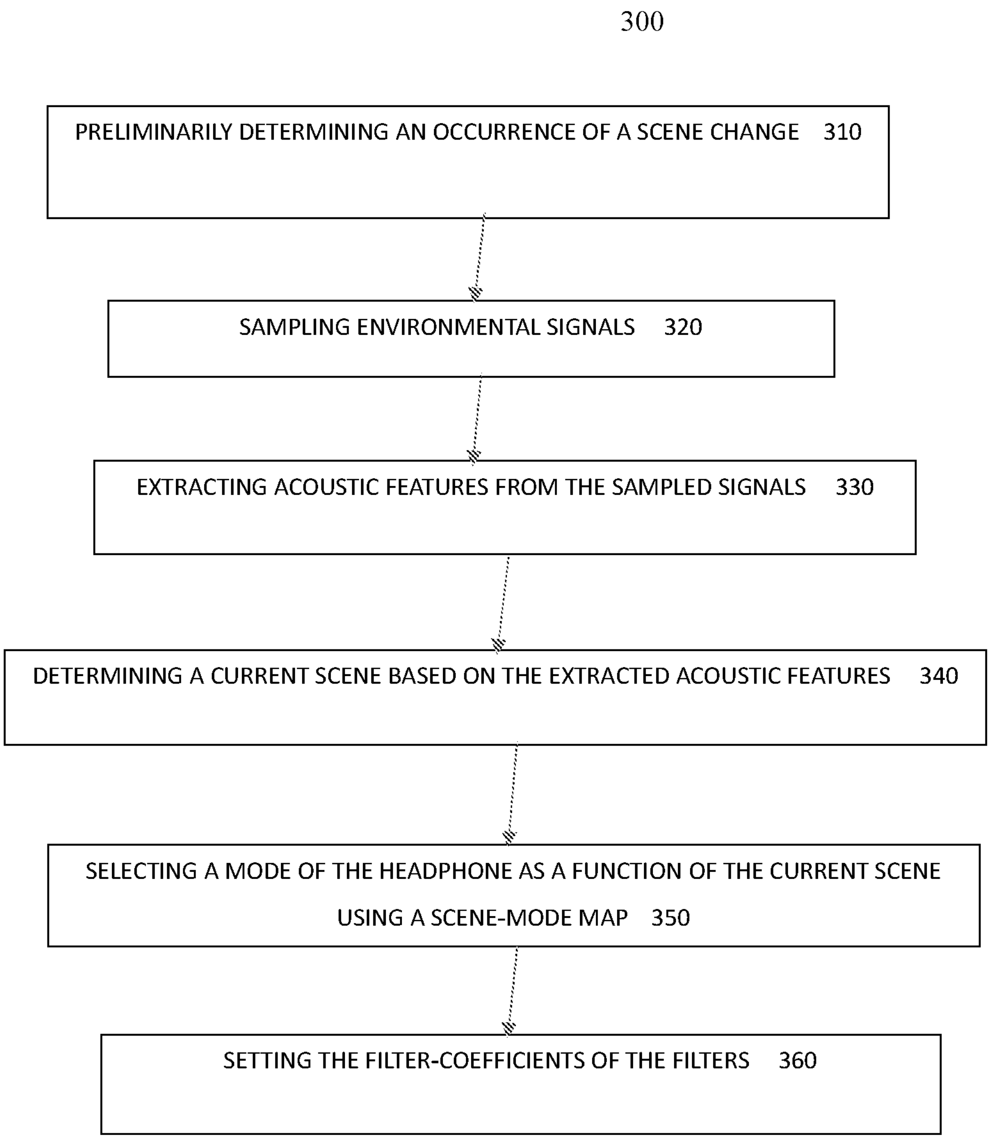
FIG. 3 is a flow chart illustrating a method 300 of switching noise reduction modes of an ANC headphone 100 according to an embodiment.

FIG. 3 is a flow chart illustrating a method 300 of switching modes (e.g., from an ANC mode to a TR mode) of an ANC headphone 100 according to an embodiment.

At 310, preliminarily determining an occurrence of a scene change by using the preliminary scene-change detection circuit 1. The algorithm 200 as explained above can be used to determine the occurrence of a scene change (e.g., from a quite-office scene to a heavy-busy-street scene). Once the occurrence of a scene change is determined, a trigger signal is sent to the scene identification circuit 2.

At 320, sampling, by a down sample circuit 10 of the scene identification circuit 2, environmental signals received from the FF microphone 5, with a low sample rate (e.g., 16 kHz), to obtain sampled signals.

At 330, extracting, using a symbol extraction circuit 11 of the scene identification circuit 2, acoustic features from the sampled signals.

At 340, determining, by a mode-match circuit (e.g., a cloud mode-match circuit 12) of the scene identification circuit 2, a current scene (e.g., the heavy-busy-street scene) based on the extracted acoustic features. The mode-match circuit can be one of a cloud mode-match circuit 12, a local mode-match circuit 13, and a keyword-match circuit 14. The multiple mode-match circuits 12-14 are connected in parallel and one of them can be used to determine the current scene in an embodiment.

At 350, selecting, by a mode switch 15, a mode (e.g., TR mode) of the headphone 100 as a function of the current scene (e.g., the heavy-busy-street scene) using a scene-mode map. The scene-mode map can be a database table (such as Table 1 as shown above) defining a scene and mode relationship (e.g., a many-to-one relationship) for example.

In an embodiment, filter-coefficients corresponding the current mode can be obtained using the scene-mode map (e.g., Table 1), can be stored in a local filter-coefficients storage 16, and can be output to the filter switch circuit 3.

At 360, setting, using the filter switch circuit 3, the filter-coefficients of the filters (such as the FF IIR filter 17, the TR IIR filter 18, and the FB IIR filter 19) such that the FF IIR filter 17, the TR IIR filter 18, and the FB IIR filter 19 work in the current mode (e.g., the TR mode).

In this way, the ANC headphone may keep on preliminarily detecting a possible scene change near the headphone using ultra-low power, trigger a scene detector to detect or determine a current scene near the headphone upon the scene change has been preliminarily detected, and switch the mode of the headphone to a current headphone mode from a previous headphone mode based on the detected current scene. Thus, the ANC headphone can operate under reduced power consumption, and can obtain an improved balance of comfortability, safety, and communicability.

Figure 4:
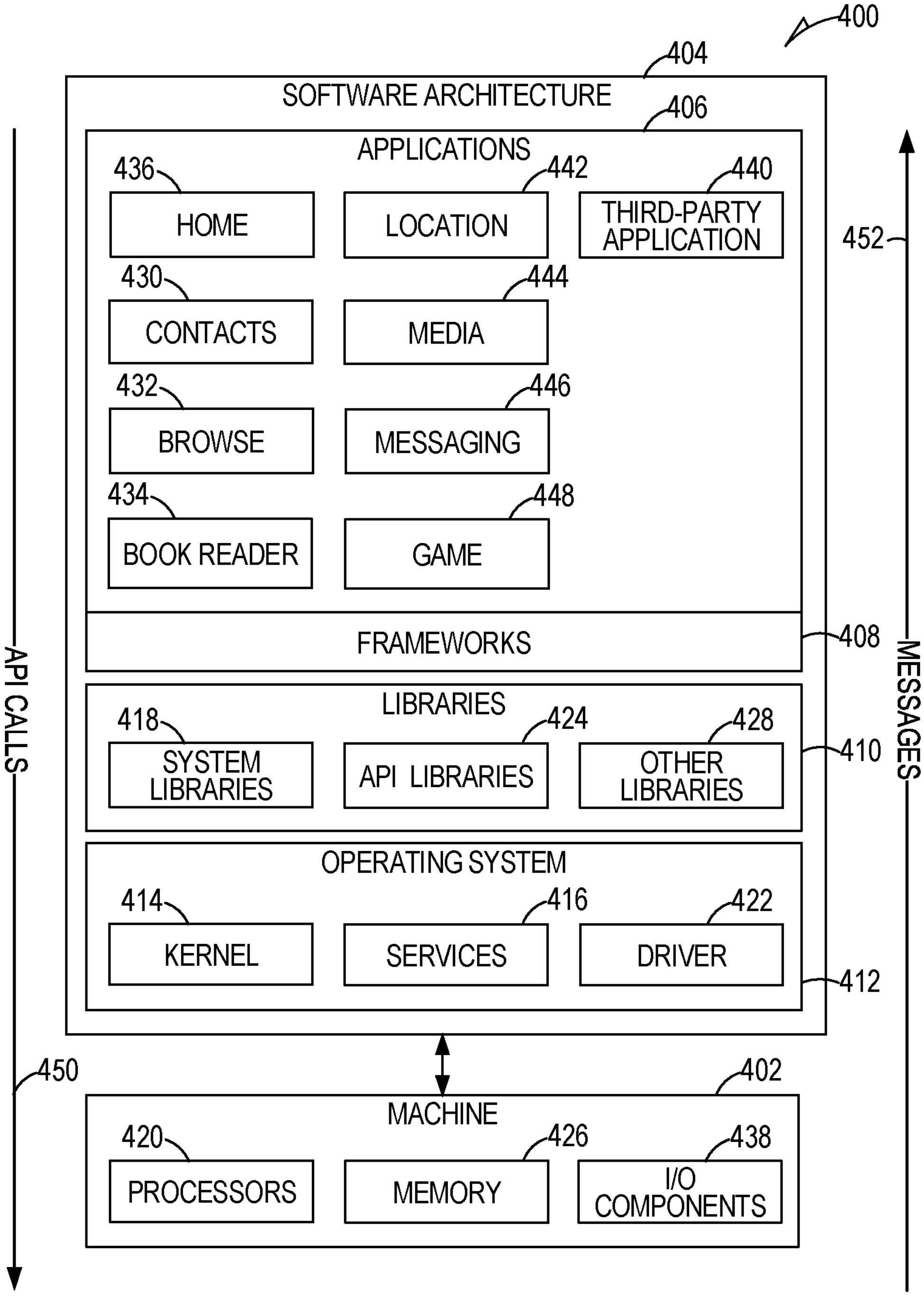
FIG. 4 is a block diagram showing a software architecture 400 within which examples may be implemented.

FIG. 4 is a block diagram 400 illustrating a software architecture 404, which can be installed on a headphone 100 described herein.

The software architecture 404 is supported by hardware such as a machine 402 that includes processors 420, memory 426, and I/O components 438. In this example, the software architecture 404 can be conceptualized as a stack of layers, where each layer provides a particular functionality. The software architecture 404 includes layers such as an operating system 412, libraries 410, frameworks 408, and applications 406. Operationally, the applications 406 invoke API calls 450 through the software stack and receive messages 452 in response to the API calls 450.

The operating system 412 manages hardware resources and provides common services. The operating system 412 includes, for example, a kernel 414, services 416, and drivers 422. The kernel 414 acts as an abstraction layer between the hardware and the other software layers. For example, the kernel 414 provides memory management, processor management (e.g., scheduling), component management, networking, and security settings, among other functionalities. The services 416 can provide other common services for the other software layers. The drivers 422 are responsible for controlling or interfacing with the underlying hardware. For instance, the drivers 422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 410 provide a common low-level infrastructure used by the applications 406. The libraries 410 can include system libraries 418 (e.g., C standard library) that provide functions such as memory allocation functions, string manipulation functions, mathematic functions, and the like. In addition, the libraries 410 can include API libraries 424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 410 can also include a wide variety of other libraries 428 to provide many other APIs to the applications 606.

The frameworks 408 provide a common high-level infrastructure that is used by the applications 406. For example, the frameworks 408 provide various graphical user interface (GUI) functions, high-level resource management, and high-level location services. The frameworks 408 can provide a broad spectrum of other APIs that can be used by the applications 406, some of which may be specific to a particular operating system or platform.

In an example, the applications 406 may include a home application 436, a contacts application 430, a browser application 432, a book reader application 434, a location application 442, a media application 444, a messaging application 446, a game application 448, and a broad assortment of other applications such as a third-party application 440. The applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party application 440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 440 can invoke the API calls 450 provided by the operating system 412 to facilitate functionality described herein.

One skilled in the art will appreciate that although specific embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. An Active Noise Cancellation (ANC) headphone (100) of multiple modes, comprising:
- a preliminary scene-change detection circuit (1) using ultra-low power to detect a scene change near the headphone, and comprising: an ultra-low power ADC (6), a Fast Fourier Transform (FFT) circuit (7), and a dedicated low-power Micro-Controller Unit (MCU) (8) connected in series, wherein the preliminary scene-change detection circuit is connected to an ultra-low power microphone (4) to capture external noise, and wherein upon detecting a scene change, the preliminary scene-change detection circuit emits a trigger signal;
- a scene identification circuit (2) connected to a Forward Feedback (FF) microphone (5) to capture the external noise, to start identifying a current scene near the headphone upon receiving the trigger signal, and to create a commend set, the scene identification circuit (2) comprising: an active controller (9) connected to the preliminary scene-change detection circuit (1), a down sample circuit (10) to sample signals received from the FF microphone (5) with a low sample rate, a symbol extraction circuit (11), a mode-match circuit (12, 13, or 14), a mode switch (15), and a local filter-coefficient storage (16), wherein the commend set comprises a set of local filter-coefficients;
- a filter switch circuit (3) to switch a headphone mode to a current headphone mode corresponding to the current scene based on the commend set received from the scene identification circuit (2), the filter switch circuit (3) comprising: a set of Infinite Impulse Response (IIR) filters (17-19) and a set of output filters (20-22) respectively connected, wherein the filter switch circuit (3) updates a set of IIR filter-coefficients of the set of IIR filters; and
- a speaker (25) connected to the filter switch circuit (3).

2. The headphone of claim 1, wherein the set of Infinite Impulse Response (IIR) filters (17-19) comprises an FF IIR filter (17), a Transparency (TP) IIR filter (18), and a FB IIR filter (19) connected in parallel with the output of the scene identification circuit (2).

3. The headphone of claim 2, further comprising an FF ANC ADC circuit (26) connected between the FF Mic (5) and a pair of the FF IIR filter (17) and TP IIR filter (18).

4. The headphone of claim 2, further comprising a FB microphone (27) placed near the speaker (25), and a FB ANC ADC circuit (28) connected between the FB microphone (27) and the FB IIR filter (19).

5. The headphone of claim 1, wherein the set of output filters (20-22) comprises an output FF IIR filter (20), an output TP filter (21), and an output FB filter (22) connected in parallel.

6. The headphone of claim 1, further comprising an adder (23) connected between the set of output filters (20-22) and the speaker (25).

7. The headphone of claim 6, further comprising music source (24) connected to the adder (23).

8. The headphone of claim 1, wherein the mode match circuit comprises a cloud mode match circuit (12).

9. The headphone of claim 1, wherein the mode match circuit comprises a local mode match circuit (13).

10. The headphone of claim 1, wherein the mode match circuit comprises a voice mode match circuit (14).

11. The headphone of claim 1, wherein the headphone modes comprise an ANC mode, a Passive Noise Cancellation (PNC) mode, and a TP mode.

12. The headphone of claim 1, wherein the preliminary scene-change detection circuit (1) using ultra-low power detects the scene change near the headphone by comparing frequency spectrums of voice signals taken near the headphone in a predetermined time interval and calculating correlation of the frequency spectrums of the voice signals.

13. A computer-implemented method of identifying a scene change near a headphone (100), comprising:
- sequentially obtaining frequency spectrums of voice signals of external noises near the headphone in a predetermined time interval (ΔT);
- comparing a current frequency spectrum (CSp) with a previous frequency spectrum (PSp) to calculate a first correlation (cor1) between the current and previous frequency spectrums;
- responsive to detecting the first correlation (cor1) greater than a first threshold (thres1), adding the current frequency spectrum to a first long-time spectrum smooth 1 (smooth1), and then smoothing the first long-time spectrum smooth;
- responsive to detecting the first correlation (corn) not greater than the first threshold (thres1), adding the current frequency spectrum to a second long-time spectrum smooth 2 (smooth2), then smoothing the second long-time spectrum smooth, and increasing a total number of frequency spectrums in the second long-time spectrum smooth by 1;
- calculating a second correlation (cor2) between the first long-time spectrum smooth (smooth1) and the second long-time spectrum smooth (smooth2); and
- responsive to detecting the second correlation (cor2) not greater than a second threshold (thres2) and detecting the total number of the frequency spectrums in the second long-time spectrum smooth (smooth 2) equal to a count-threshold (cnt-thres), determining an occurrence of scene change near the headphone to send off a trigger signal.

14. The method of claim 13, wherein the predetermined time interval is in a range of 100-150 ms.

15. The method of claim 13, wherein the trigger signal is sent to a circuit to determine a current scene near the headphone.

16. The method of claim 13, wherein after sending off the trigger signal, the first long-time spectrum smooth (smooth1) is updated with the second long-time spectrum smooth (smooth2), the second long-time spectrum smooth is then cleared, and the total number of frequency spectrums in the second long-time spectrum smooth (smooth2) is set as 0.

17. A computer-implemented method of switching headphone modes of a headphone (100), the headphone comprising: a preliminary scene-change detection circuit (1) operating under ultra-low power; a scene identification circuit (2); and a filter switch circuit (3) comprising a set of filters (17, 18 and 19), the method comprising:
- preliminarily detecting a scene change near the headphone by the preliminary scene-change detection circuit (1);
- responsive to detecting the scene change, identifying a current scene by the scene identification circuit (2) to output a commend set comprising a first set of filter coefficients; and
- responsive to receiving the commend set, switching by the filter switch circuit (3) a headphone mode of the headphone to a current headphone mode, by updating a second set of filter coefficients of the set of filters of the filter switch circuit based on the commend set from the scene identification circuit (2).

18. The method of claim 17, wherein detecting the scene change near the headphone by the preliminary scene-change detection circuit (1) comprises comparing frequency spectrums of voice signals taken near the headphone in a predetermined time interval and calculating correlation of the frequency spectrums of the voice signals.

19. The method of claim 17, wherein identifying the current scene by the scene identification circuit (2) comprises sampling, by a down sample circuit (10), signals of external noises received from a Forward Feedback (FF) microphone (5) with a low sample rate to obtain sampled signals;

extracting, by a symbol extraction circuit (11), acoustic features from the sampled signals; and determining, by the scene identification circuit (2), the current scene based on the extracted acoustic features.

20. The method of claim 17, wherein switching by the filter switch circuit (3) a headphone mode of the headphone to a current headphone mode comprising:

selecting, by a mode switch (15), the current mode as a function of the current scene using a scene-mode map that defines a scene-mode relationship; and setting, using the filter switch circuit (3), the filter-coefficients of the filters of the filter switch circuit (3).

* * * * *